United States Patent [19]

Izuchi et al.

[11] Patent Number: 4,667,894
[45] Date of Patent: May 26, 1987

[54] WEBBING LOCK APPARATUS

[75] Inventors: Shingo Izuchi; Keiichi Tamura; Shinji Mori, all of Aichi, Japan

[73] Assignee: Kabushiki Kaisha Toka-rika-denki-seisakusho, Aichi, Japan

[21] Appl. No.: 781,652

[22] Filed: Sep. 30, 1985

[30] Foreign Application Priority Data

Oct. 1, 1984 [JP] Japan .......................... 59-148913[U]

[51] Int. Cl.$^4$ ...................... B60R 22/40; B60R 22/42
[52] U.S. Cl. ............................ 242/107.4 A; 242/107.2
[58] Field of Search ..................... 242/107.2, 107.4 C, 242/107.4 A; 280/806, 807, 808; 297/478, 480

[56] References Cited

U.S. PATENT DOCUMENTS

| | | | |
|---|---|---|---|
| 4,273,301 | 6/1981 | Frankila | 242/107.2 |
| 4,343,488 | 8/1982 | Stephenson | 242/107.4 C X |
| 4,378,916 | 4/1983 | Keinberger | 242/107.2 |

FOREIGN PATENT DOCUMENTS 0055119  5/1977  Japan .......................... 242/107.4 C Primary Examiner—John M. Jillions
Attorney, Agent, or Firm—Sixbey, Friedman & Leedom

[57] ABSTRACT

A webbing lock apparatus for use in a vehicle has a U-shaped frame, and a webbing take-up shaft rotatably supported by a shaft carriage. The carriage is pivotally mounted on the frame and biased toward one direction. When an emergency situation of a vehicle occurs, a ratchet is activated so as to lock the take-up shaft and to cause the shaft carriage to pivot on the frame in another direction as a result of the webbing tension. This movement causes the webbing wound around the take-up shaft to abut against a fixed pressing member also mounted on the frame. In consequence, the amount of webbing wound off of the take-up shaft in an emergency situation of the vehicle is minimized.

13 Claims, 3 Drawing Figures

WEBBING LOCK APPARATUS

BACKGROUND OF THE INVENTION

1. Field of the Invention:

The present invention relates to a webbing lock apparatus for use in a seatbelt system designed to protect an occupant of a vehicle when an emergency situation of the vehicle occurs, the apparatus being adapted to prevent the occupant restraining webbing of the seatbelt system from moving longitudinally in an emergency situation of the vehicle.

2. Description of the Prior Art:

A typical seatbelt system of the type described above is arranged such that the occupant restraining webbing is automatically wound up into a webbing retractor when it is not used, and can be pulled out with a relatively small force when it is to be used. When fastened to the body of an occupant, the webbing does not restrict the movement of his body, but when a vehicular emergency occurs, the webbing is prevented from moving longitudinally, thus restricting the movement of the body of the occupant reliably, and protecting the occupant from injury. For this purpose, a conventional emergency lock apparatus employed in the seatbelt system has an arrangement such that one end portion of the webbing is wound up on a webbing take-up shaft with a ratchet wheel secured thereto, and when a vehicular emergency situation occurs, the pendulum of an inertia-type lock mechanism, which swings in response to gravitational acceleration, activates a pawl so as to engage with a tooth of the ratchet wheel, thereby stopping the wind-off of the webbing.

However, when this type of conventional emergency lock apparatus is employed in an automatic seatbelt system which enables an occupant to be automatically fastened by the webbing when he enters the vehicle and seats himself in the seat, it is necessary for the length of the webbing to be increased from the viewpoint of the mechanism of the automatic seatbelt system, which means that the diameter of the roll of webbing wound up on the take-up shaft is increased. In consequence, even when the rotation of the webbing take-up shaft is suspended by the operation of the inertia-type lock mechanism in the emergency situation of the vehicle, the portion of the webbing wound on the take-up shaft in layers is tightened by the force of inertia acting on the body of the occupant, and the extra amount by which the webbing is undesirably wound off increases correspondingly.

To prevent the webbing from being undesirably wound off, one type of webbing lock apparatus has already been proposed in which the portion of the webbing unwound from the webbing take-up shaft is clamped by a pair of lock members. However, in this type of conventional webbing lock apparatus, the webbing must be passed over a plurality of rollers in order to pass the webbing through the area between the lock members. As a result, the movement of the webbing when it is wound in and out in normal use is undesirably retarded by means of the friction occurring between the webbing and the rollers.

SUMMARY OF THE INVENTION

In view of the above-described circumstances, it is a primary object of the present invention to provide a webbing lock apparatus which enables the webbing to be wound in and out by a relatively small force in normal use and is still capable of reliably preventing the webbing from being undesirably wound off in the emergency situation of the vehicle.

To this end, the present invention provides a webbing lock apparatus in which a webbing take-up shaft, which has a ratchet wheel and winds up a webbing from one end thereof, is rotatably supported on a shaft carriage pivotally mounted and provided with a pivotal pawl which engages with the ratchet wheel, and in which a fixed pressing member is disposed so as to face the direction in which the webbing is wound off from the roll of webbing wound on the webbing take-up shaft and so as to oppose the outer peripheral surface of the roll of webbing. The shaft carriage is biased by means of a spring in the direction in which the shaft carriage pivots away from the fixed pressing member. When the pawl engages with the ratchet wheel to stop and prevent the rotation of the webbing take-up shaft, the shaft carriage is pivoted by means of the tension being applied to the webbing, thus causing the outer peripheral surface of the roll of webbing to be pressed against the fixed pressing member.

By virtue of this arrangement, it is possible to reliably prevent the webbing from being undesirably wound off when a vehicular emergency situation occurs.

BRIEF DESCRIPTION OF THE DRAWINGS

The above and other objects, features and advantages of the present invention will become more apparent from the following description of the preferred embodiment thereof, taken in conjunction with the accompanying drawings, in which like reference numerals denote like elements, and in which.

DESCRIPTION OF THE PREFERRED EMBODIMENT

The present invention will be described below by way of one embodiment thereof with reference to the accompanying drawings.

Figure 1:
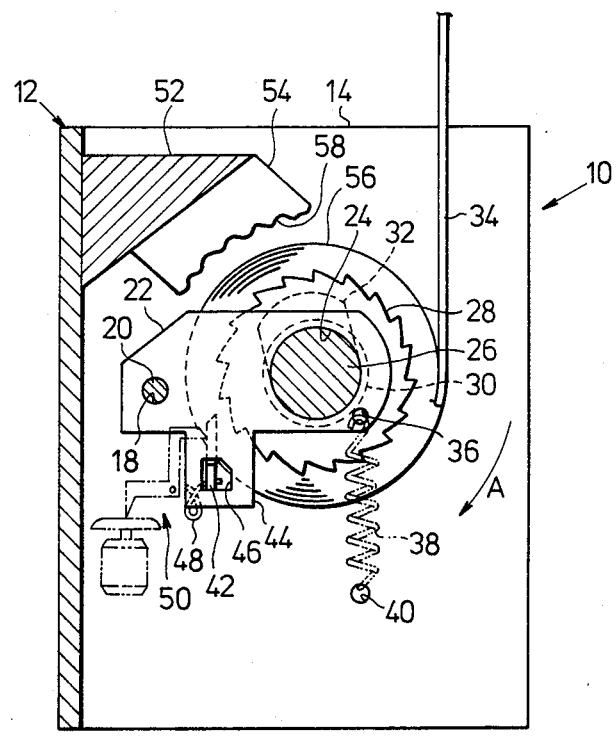
FIG. 1 is a vertical sectional view of a webbing retractor to which one embodiment of the webbing lock apparatus according to the present invention is applied.
Figure 2:
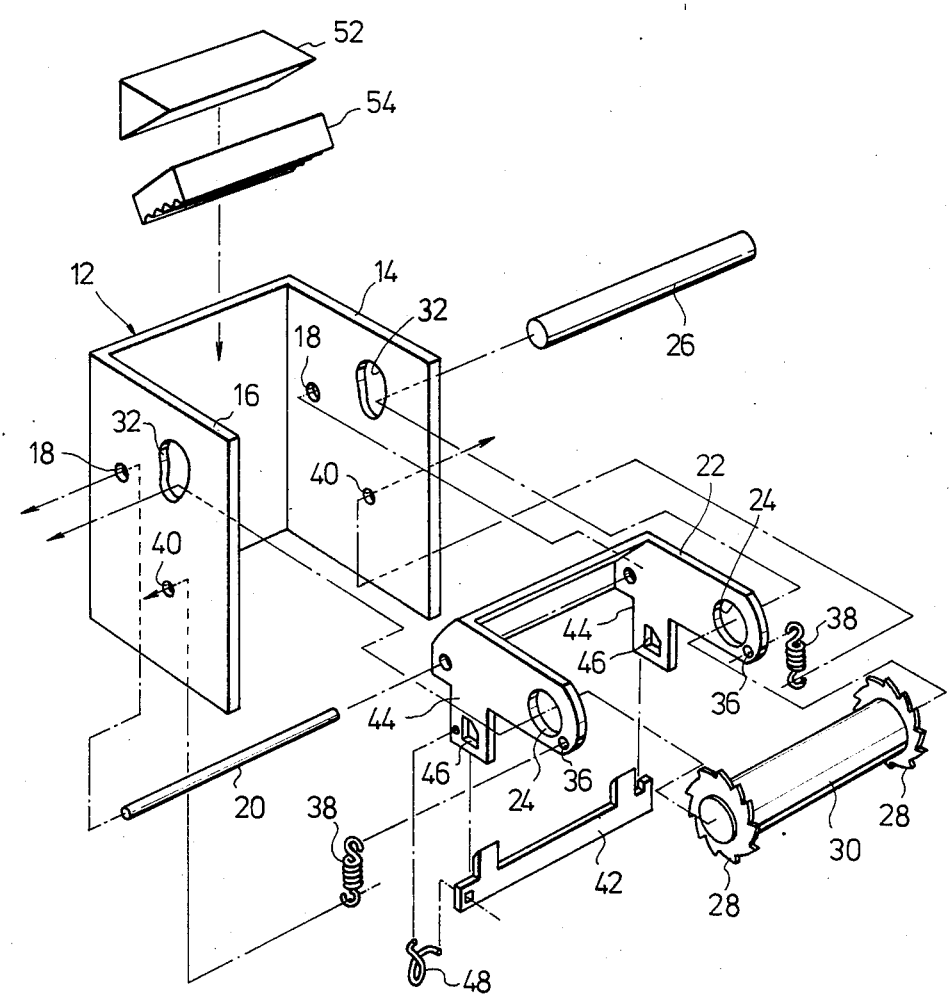
FIG. 2 is an exploded perspective view of the webbing retractor shown in FIG. 1, with some portions thereof omitted.
Figure 3:
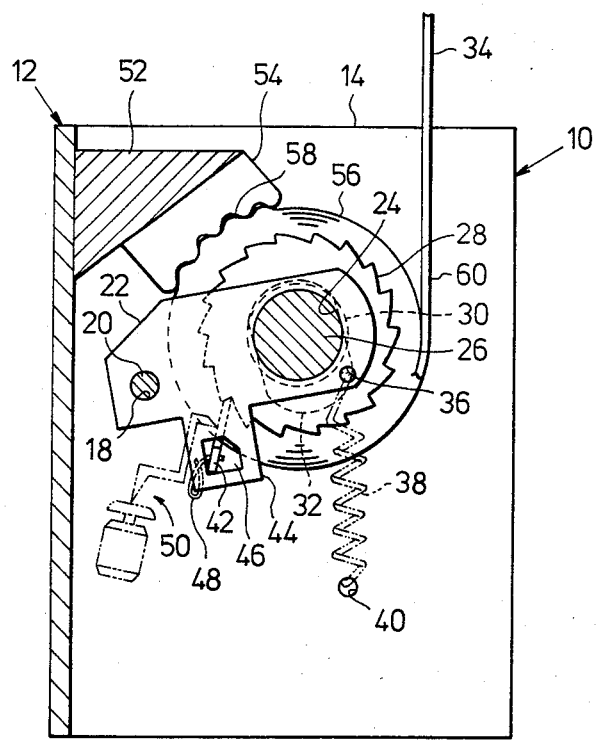
FIG. 3 is a vertical sectional view corresponding to FIG. 1, which shows the operation of the embodiment.

FIG. 1 is a vertical sectional view of a webbing retractor 10 to which one embodiment of the webbing lock apparatus according to the present invention is applied, while FIG. 2 is an exploded perspective view of the webbing retractor 10, with some portions thereof omitted.

In the webbing retractor 10, a frame 12 with a U-shaped cross-section has a pair of parallel leg plates 14 and 16 provided on both sides thereof and is secured to the vehicle body by bolts or other fastening means.

The webbing retractor 10 in accordance with this embodiment has a shaft carriage 22 which is pivotally mounted on a shaft 20 having both ends carried through bores 18 formed in the leg plates 14 and 16, respectively. The shaft carriage 22 has a shaft 26 having both ends rotatably carried through circular bores 24 formed in the shaft carriage 22, respectively. The shaft 26 rotatably supports a tubular webbing take-up shaft 30 having ratchet wheels 28 secured to both ends thereof. Both ends of the shaft 26 are carried through slots 32 formed in the leg plates 14 and 16, respectively. In this seatbelt system, a webbing 34 has one end thereof secured to the webbing take-up shaft 30 and is wound in layers on the take-up shaft 30 by means of the biasing force applied to the take-up shaft 30 by a spiral spring (not shown). A tongue plate is attached to the other end (not shown) of the webbing 34. When an occupant engages this tongue plate with a buckle device secured to the vehicle body, the occupant can be fastened by the intermediate portion of the webbing 34.

One end of each of the tension coil springs 38 is retained by one of the corresponding bores 36 formed in the shaft carriage 22, and the other end of each tension coil spring 38 is retained by one of the corresponding bores 40 respectively formed in the leg plates 14 and 16, whereby the shaft carriage 22 is biased clockwise as viewed in FIG. 1. The clockwise pivotal movement of the shaft carriage 22 is prevented by the shaft 26 when it is retained by the respective lower end edges of the slots 32 of the leg plates 14 and 16.

The shaft carriage 22 is further provided with a pawl 42 which engages with the ratchet wheels 28. The pawl 42 has both longitudinal end portions pivotally supported by bores 46 formed in projecting pieces 44 of the shaft carriage 22, respectively, each of the bores 46 having an angular portion. The pawl 42 is biased by a spring 48 in the direction in which the engagement pieces formed at the distal end of the pawl 42 disengage from the corresponding ratchet wheels 28. The pawl 42 is tilted by the operation of an acceleration sensor 50 which is constituted by a pendulum and other associated members shown by the imaginary line in FIG. 1 so that the engagement pieces engage with the ratchet wheels 28, respectively, thereby preventing the rotation of the webbing take-up shaft 30 in the direction in which the webbing 34 is wound off (opposite to the direction of the arrow A).

A fixed pressing member 54 is secured to the slanting surface of a wedge-shaped base 52 which is disposed above the shaft carriage 22 and secured to the frame 12. The fixed pressing member 54 is disposed so as to face the outer peripheral surface 56 of the roll of webbing 34 wound on the take-up shaft 30. The surface 58 of the fixed pressing member 54 facing the outer peripheral surface 56 is concaved as well as corrugated.

The following is a description of the operation of this embodiment.

When the vehicle is running in a normal state, the shaft carriage 22 is biased downwards in a position wherein the shaft 26 is retained by the respective lower end edges of the slots 32 of the leg plates 14 and 16, as shown in FIG. 1. Accordingly, the outer peripheral surface 56 of the roll of webbing 34 and the surface 58 of the fixed pressing member 54 are separated from each other. In this state, the webbing take-up shaft 30 is rotatable, so that the webbing 34 can be wound off from the webbing roll on the take-up shaft 30 against the biasing force applied to the shaft 30 so as to rotate in the direction of the arrow A. When the webbing 32 is loosened, it is automatically wound up onto the webbing take-up shaft 30 correspondingly. It is therefore possible for the occupant to assume any desired driving position.

When the vehicle runs into an emergency situation, the pawl 42 is tilted by the operation of the acceleration sensor 50 so as to engage with the ratchet wheels 28, thereby instantaneously stopping the rotation of the webbing take-up shaft 30 in the direction in which the webbing 34 is wound off. At the same time, the occupant fastened by the webbing 34 suddenly moves in the direction in which the webbing 34 is wound off, causing a large tension to be applied to the webbing 34. This tension causes the shaft carriage 22 to be pivoted counterclockwise against the biasing force of the tension coil springs 38, whereby the outer peripheral surface 56 of the webbing roll is pressed against the corrugated surface 58 of the fixed pressing member 54.

Accordingly, the portion of the webbing 34 wound in layers on the webbing take-up shaft 30 is not subjected to a large tension which would cause the webbing 34 to be undesirably wound off, so that the extra amount by which the webbing 34 is wound off by tightening is extremely small.

Thus, it is possible to reduce the extra amount by which the webbing 34 is wound off in the emergency situation of the vehicle. When the outer peripheral surface 56 of the webbing roll is pressed against the surface 58 of the fixed pressing member 54, the tension applied to the unwound portion 60 of the webbing 34 causes the outermost portion of the webbing 34 on the lower side of the webbing roll, which extends from the point where the webbing roll is pressed by the surface 58 of the fixed pressing member 54 to the position from which the webbing 34 is unwound, to press the inner layers of the webbing roll toward the take-up shaft 30, resulting in frictional resistance. In consequence, the webbing tension in the unwound portion 60 is considerably damped by the time it reaches the pressing member 54 by virtue of the frictional resistance. It is therefore possible to reliably prevent the webbing 34 from being undesirably wound off even with a relatively small pressure applied by the pressing member 54.

What is claimed is:

1. A webbing lock apparatus for use in a webbing retractor employed in a seatbelt system designed to protect an occupant of a vehicle when an emergency situation occurs, said apparatus comprising:
   (a) a frame secured to the vehicle body and having a pair of leg plates;
   (b) a shaft carriage having first and second ends each of which is separately pivotally connected to one of the leg plates of the frame;
   (c) a take-up shaft having both ends rotatably supported at both end portions of said shaft carriage, respectively, said take-up shaft having a webbing wound thereon in layers;
   (d) lock means for preventing said take-up shaft from rotating in a direction in which the webbing is wound off when a vehicular emergency situation occurs;
   (e) retainer means which retains said shaft carriage at a first position and allows said shaft carriage to move to a second position when the webbing tension increases as a result of the operation of said lock means; and
   (f) a fixed pressing member which is rigidly affixed to said frame and which abuts against said webbing wound on the outer periphery of said take up shaft when said shaft carriage reaches said second position, whereby a large force acting so as to wind off said webbing in the emergency situation of the vehicle is prevented from acting on the portion of said webbing wound in layers on said take-up shaft, thereby reducing the extra amount by which said webbing is wound off in the emergency situation of the vehicle.

2. A webbing lock apparatus according to claim 1, wherein said lock means has a ratchet wheel secured to said take-up shaft, and a pawl pivotally supported by said shaft carriage so as to engage with said ratchet wheel when a vehicular emergency situation occurs.

3. A webbing lock apparatus according to claim 2, wherein said fixed pressing member has a curved surface abutting on and curved along the outer periphery of said webbing wound on the outer periphery of said take-up shaft.

4. A webbing lock apparatus according to claim 3, wherein said shaft carriage is constituted by a plate member bent in the shape of a U, said shaft carriage being pivotally supported by said frame at an approximately central portion thereof and rotatably supporting said take-up shaft at both end portions thereof.

5. A webbing lock apparatus according to claim 4, wherein the length of the portion of said webbing between the position from which said webbing is unwound from said take-up shaft so as to the extend to the portion of said webbing by which the occupant is fastened, and the point at which said webbing is contacted by said fixed pressing member, is a half or more of the circumference of the roll of said webbing wound in layers on said take-up shaft.

6. A webbing lock apparatus according to claim 3, wherein the curved surface of said fixed pressing member is corrugated.

7. A webbing lock apparatus according to claim 1, wherein said retainer means is constituted by a resilient member interposed between said shaft carriage and the frame which pivotally supports said shaft carriage.

8. A webbing lock apparatus according to claim 1, wherein said fixed pressing member is secured to a wedge-shaped base secured to the frame through which said shaft carriage is pivotally supported by the vehicle body.

9. A webbing lock apparatus according to claim 3, further comprising a shaft rotatably supported by said shaft carriage and extending through said take-up shaft, said shaft being disposed within a slot formed in said frame, thereby restricting the pivotal angle of said shaft carriage.

10. A webbing lock apparatus for use in a webbing retractor employed in a seatbelt system designed to protect an occupant of a vehicle when an emergency situation occurs, said apparatus comprising:
(a) a frame secured to the vehicle body and having a pair of leg plates;
(b) a U-shaped shaft carriage pivotally supported on both ends by the leg plates of said frame;
(c) a webbing take-up shaft having both ends rotatably supported at both end portions of said shaft carriage, respectively, said take-up shaft having a webbing wound thereon in layers;
(d) a ratchet wheel secured to said take-up shaft for preventing the take-up shaft from rotating in a direction in which the webbing is wound off when a vehicular emergency situation occurs;
(e) a pawl which engages with said ratchet wheel in the emergency situation of the vehicle;
(f) a retainer means for retaining the shaft carriage in a first position and allowing the carriage to move in a second position when the webbing tension increases as a result of the operation of the ratchet wheel and pawl, including a biasing means for biasing said shaft carriage in in said first direction; and
(g) a fixed pressing member which is rigidly affixed to said frame and which abuts against the webbing wound on the outer periphery of said take-up shaft when said pawl engages with said ratchet wheel and said shaft carriage is moved in the second direction against the biasing force of said biasing means, thereby preventing the webbing tension from acting on said portion of said webbing wound in layers.

11. A webbing lock apparatus according to claim 10, wherein the length of the portion of said webbing between the position from which said webbing is unwound from said take-up shaft so as to extend to the portion of said webbing by which the occupant is fastened, and the position at which said webbing is contacted by said fixed pressing member, is a half or more of the circumference of the roll of said webbing wound in layers on said take-up shaft.

12. A webbing lock apparatus according to claim 10, wherein the portion of said fixed pressing member which abuts against said webbing has a corrugated surface.

13. A webbing lock apparatus for use in a webbing retractor employed in a seatbelt system designed to protect an occupant of a vehicle when an emergency situation occurs, comprising:
(a) a frame secured to the vehicle body and having a pair of leg plates;
(b) a shaft carriage pivotally supported at both ends by the respective leg plates of said frame and movable into first and second locations;
(c) a webbing take-up shaft having both ends rotatably supported at both end portions of said shaft carriage, respectively, said take-up shaft having a webbing wound thereon in layers;
(d) a ratchet wheel secured to the take-up shaft for preventing the take-up shaft from rotating in a direction in which the webbing is wound off when a vehicular emergency occurs;
(e) a pawl that engages with said ratchet wheel in the emergency situation of the vehicle, wherein said pawl is actuated solely by a single acceleration sensor;
(f) a biasing means for biasing shaft carriage in said first position and allowing the carriage to pivot into said second position when the webbing tension increases as a result of the operation of said ratchet and pawl, wherein said biasing means applies substantially equal amounts of biasing force at each pivotal connection between the ends of the shaft carriage and the legs of the frame and
(g) a fixed pressing member which is rigidly affixed to said frame and which brakingly abuts against the webbing wound on the outer periphery of said take-up shaft when said pawl engages with said ratchet wheel and said shaft carriage is pivotally moved into the second position against the biasing force of said biasing means, thereby preventing the webbing tension from acting on said portion of said webbing wound in layers.

* * * * *